United States Patent [19]

Hamon et al.

[11] Patent Number: 5,157,493
[45] Date of Patent: Oct. 20, 1992

[54] SYNCH RESPONSIVE AGC UTILIZING A-D CONVERTER

[75] Inventors: Joel Hamon, Lipsheim; Albert Dorner, Strasbourg, both of France

[73] Assignee: Laboratoire Europeen De Recherches Electroniques Appliquees Societe En Nom Collectif, Courbevoie, France

[21] Appl. No.: 585,942

[22] Filed: Sep. 21, 1990

[30] Foreign Application Priority Data

Sep. 22, 1989 [FR] France .................. 89 12483

[51] Int. Cl.⁵ ............................................. H04N 5/52
[52] U.S. Cl. ..................................... 358/176; 341/139
[58] Field of Search ................ 358/174, 176, 178; 341/139

[56] References Cited

U.S. PATENT DOCUMENTS

| 1,680,390 | 8/1928 | Nyquist | 358/176 X |
|---|---|---|---|
| 2,214,847 | 9/1940 | Wilson | 358/176 |
| 2,240,600 | 5/1941 | Applegarth, Jr. | 358/176 |
| 2,934,602 | 4/1960 | Cope et al. | 358/176 |
| 2,938,950 | 5/1960 | Gent | 358/178 |
| 3,560,648 | 2/1971 | Kitsopoulos | 358/178 |
| 4,434,439 | 2/1984 | Steckler et al. | 358/176 |
| 4,628,362 | 12/1986 | Waehner | 358/174 |
| 4,827,191 | 5/1989 | Chapman | 341/139 X |
| 4,831,378 | 5/1989 | Baars et al. | 358/174 X |

FOREIGN PATENT DOCUMENTS 271936 6/1988 European Pat. Off. .
62-29377 2/1987 Japan .

*Primary Examiner*—James J. Groody
*Assistant Examiner*—Mark R. Powell
*Attorney, Agent, or Firm*—Oblon, Spivak, McClelland, Maier & Neustadt

[57] ABSTRACT

Disclosed is an apparatus for the reception of video signals with a variable gain amplifier to hold the video signal between pre-determined limits. To control the gain of the amplifier, there is provision for a circuit that keeps the amplitude of the line synchronization pulse substantially constant. This circuit has, for example, an analog/digital converter with an output, one bit of which represents the sign of the difference between the line synchronization pulse and its prescribed value.

11 Claims, 1 Drawing Sheet

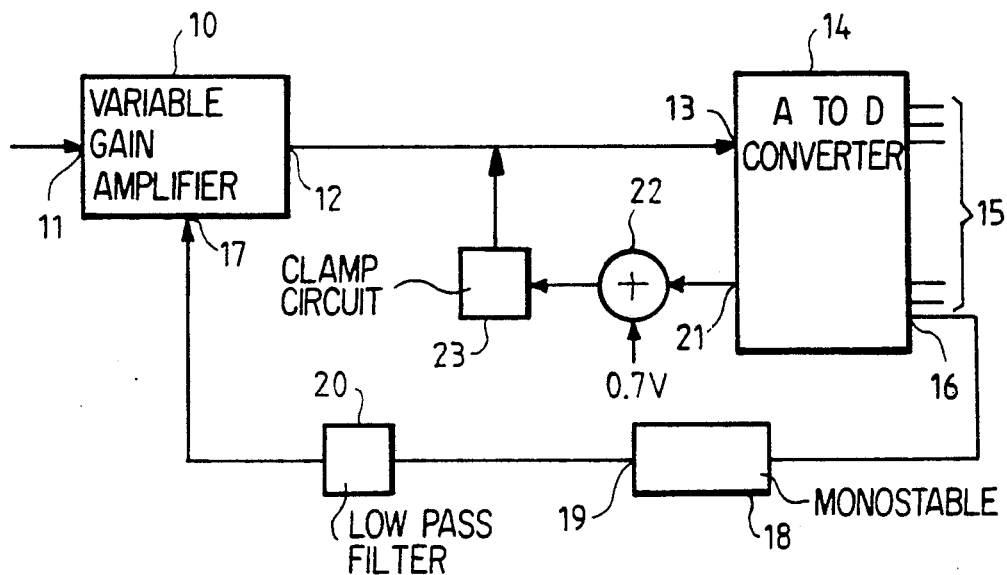
FIG_1
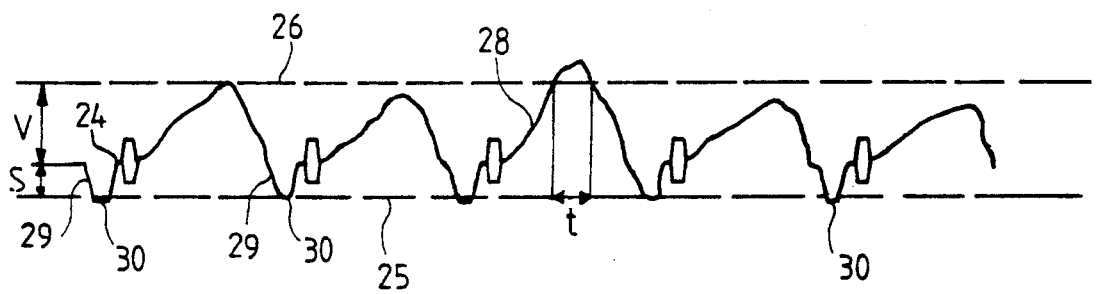
FIG_2
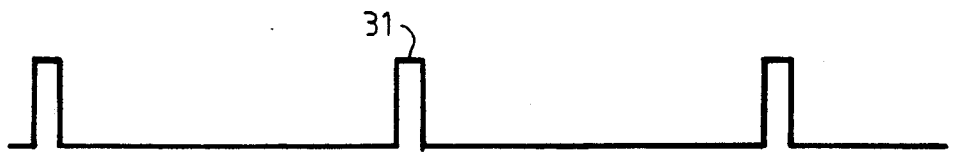
FIG_3
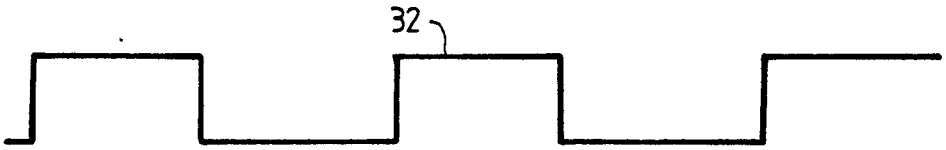
FIG_4

SYNCH RESPONSIVE AGC UTILIZING A-D CONVERTER

BACKGROUND OF THE INVENTION

1. Field of the Invention

The invention pertains to an apparatus for the reception of video signals.

It is known that television signals are transmitted in the form of successive lines with the following, notably, for each line: a synchronization pulse, a constant level that acts as a reference for the black level of the image and is called the "back porch", and the video signal in analog form.

In television receivers or, more generally, in video signals reception equipment, there is provision for automatic gain control circuits that make it possible to hold the amplitude of the video signals between limits that are acceptable for good quality of the image. This automatic gain control is usually done by detecting a determined level of the video signal, notably the peak value of the signal, and the signal thus detected is used to activate a gain control device or a variable gain amplifier in order to hold the video signal between the prescribed limits.

2. Description of the Prior Art

It has been observed that the known circuits do not always satisfactorily regulate the amplitude of the video signal, especially when this video signal has to be converted into digital form. Indeed, in this latter case, the problem of the dynamic range of the analog video signal is particularly acute because the analog/digital converter has to be held between a lower level and an upper level, failing which the values that overstep the limits are not restored accurately.

The invention enables a satisfactory regulation of the amplitude of the video signal, notably when there is provision for an analog/digital converter.

SUMMARY OF THE INVENTION

According to the invention, there is proposed an apparatus including a circuit to control the gain of an element with variable gain so as to keep the amplitude of the line synchronization pulse substantially constant.

Since the amplitude of the line synchronization pulse remains constant, the video signal remains at the same scale.

Furthermore, the regulation of amplitude of the video signal is independent of the content of the image.

When the variable gain element receiving the video signal has its output connected to the input of an analog/digital converter that converts the analog signals, between a pre-determined lower level and a pre-determined upper level, into digital signals, there is provision, preferably, for a means to hold the lowest level or bottom of the line synchronization pulse substantially at its lowest level.

With an analog/digital converter, the fact of overstepping the prescribed value for the amplitude of the line synchronization pulse is advantageously indicated by a bit (binary figure) at output of the converter. The circuit is thus very simple to make.

In one embodiment, the signal indicating that the amplitude of the line synchronization pulse has been exceeded triggers a monostable, the output signal of which has a duration of about 60 microseconds, this latter signal being used to control the amplitude of the video signal.

According to another of its aspects, the invention concerns an apparatus for the reception of video signals, comprising an analog/digital converter to convert analog video signals, between a predetermined lower level and a pre-determined upper level, into digital signals, wherein said apparatus includes a means to keep the bottom of the line synchronization pulse substantially at the lower level.

BRIEF DESCRIPTION OF THE DRAWINGS

Other characteristics and advantages of the invention will appear from the description of certain of its embodiments, said description being made with reference to the appended drawings, wherein:

FIG. 1 is a diagram of a device according to the invention, and

FIGS. 2, 3 and 4 are graphs explaining the working of the device of FIG. 1.

DESCRIPTION OF A PREFERRED EMBODIMENT

The device shown in FIG. 1 is designed to equip a receiver of scrambled television signals wherein the scrambled television signals received are converted into digital form in order to then undergo an unscrambling operation.

This device includes a variable gain amplifier 10, to the input 11 of which the video signal is applied. The output 12 of this variable gain amplifier 10 is connected to the input 13 of an analog/digital converter 14 having parallel outputs 15 and an additional output 16 at which there appears a binary signal "1" (or "0") when the amplitude of the synchronization pulse oversteps a determined value as is explained further below with reference to FIGS. 2 and 3.

This output 16 is connected to the gain control input 17 of the amplifier 10 by means of a monostable 18, for which the hold time of the output signal 19 is about 60 microseconds (that is, almost the complete duration of the line) and a low-pass filter 20.

The analog/digital converter 14 has another output 21 at which there appears a potential representing the lower limit of the permissible potential for the signals at the input 13 of this converter. The signal at the output 21 is added to a 0.7 volt signal by means of an adder 22, and the output signal of this adder 22 acts on a standard clamping circuit 23 which fixes the black level 24, or back porch, of the video signal (FIG. 2) at a value of 0.7 volts above the reference signal 25 appearing at the output 21 of the converter 14. More precisely, the clamping circuit 23 contains a capacitor, the charge of which is fixed, by the signal coming out of the adder 22, during the period corresponding to the back porch 24 (FIG. 2) and this charge determines the general level of the video signal throughout the line.

The operation is as follows:

The converter 14 converts the analog signals applied to its input 13 into digital signals which it delivers at its parallel outputs 15. However, the conversion is achieved faithfully only if the signals at the input 13 have a potential between a lower level 25 and an upper level 26 (FIG. 2). For example, if the video signal 28 oversteps the level 26 for a duration t, the converter will give, at its parallel outputs 15, a signal that corresponds to this level 26 during the interval t. The device of FIG. 1 enables the video signal 28 to be held below the level 26 by means of the gain control amplifier 10 and the clamping circuit 23.

The loop including the adder 22 and the clamping circuit 23 makes it possible, at each line, to hold the black level 24 at a potential of 0.7 volts above the level 25.

Furthermore, according to an arrangement of the invention, on the basis of the observation that the maximum amplitude s of the synchronization pulse 29 is proportional to the maximum amplitude v of the video signal proper, to hold the video signal 28 below the level 26, the gain of the amplifier 10 is controlled through a signal representing (notably by its sign) the difference between the low level 30 of the line synchronization pulse 29 on the one hand, and the level 25 on the other.

A pulse 31 (FIG. 3) indicating that a limit has been overstepped appears at the output 16 of the converter 14 when the bottom 30 of the pulse 29 is below the level 25. This pulse 31 triggers the monostable 18 which delivers, at its output 19, a signal 32 (FIG. 4) with a constant level for 60 microseconds, i.e. for the rest of the video line considered. This signal 32 is applied to the gain control input 17 of the amplifier 10 by means of the low-pass filter 20. This comparison and generation of a signal continues for all lines in a frame. This input receives a continuous signal, the level of which depends on the frequency at which the level 30 falls below the level 25. This continuous signal at the input 17 will be maximum if the amplitude s is too high for all the lines (i.e. the monostable is triggered for all lines or a large group of lines) and, in this case, a maximum value of gain reduction of the amplifier 10 will be ordered so that the level 30 rises again above the level 25. By contrast, if the frequency for which the amplitude s is too high is relatively low, then the gain reduction ordered will be relatively low. In this way, the reduction in the amplitude of the video signal 28 proper is all the greater as the extent to which the maximum level of the signal has overstepped the admissible level 26 is great.

Apart from the already mentioned advantages, the invention enables a correction to be made when the video signal is not visible on the screen.

The value of 0.7 volts applied to the second input of the adder 22 makes it possible to obtain a result wherein, under normal conditions, the bottom 30 of the line synchronization pulse 29 is held practically at the level 25, since the standardized value of the amplitude s of this pulse is 0.6 volts, i.e. hardly different from 0.7 volts.

Thus, the working of the device can also be explained as follows: owing to the difference, laid down, of 0.7 volts between the black level 24 and the low level 25 of the converter 14, the difference between the level 30 of the bottom of the pulse 29 and the level 25 is small. The result of this is, firstly, that the entire video signal (line synchronization pulse plus video signal proper) gets closer to the low limit 25 than to the high limit 26 and, secondly, that in practice the bottom 30 of the pulse 29 coincides with the low level 25 through the effect of the regulation.

The invention is not limited to the control of the amplitude of the video signal applied to the input of an analog/digital converter. It concerns, more generally, the servo-control of the amplitude of the video signal of an apparatus for the reception of television broadcasts. It is characterized in that the gain of an element (amplifier or automatic gain control device) receiving the video signal is controlled in such a way that the amplitude of the synchronization pulse is constant.

What is claimed is:

1. An apparatus for the reception of video signals comprising:
    a variable gain element to hold the video signal between pre-determined limits, including a circuit to control the gain of said element so as to keep the amplitude of the line synchronization pulse substantially constant;
    wherein said circuit to control the gain of said element receives an overstepping signal from the most significant bit of an analog to digital converter.

2. An apparatus according to claim 1, comprising a clamping means to hold the back porch of the video signal at a constant level and a means to compare the level of the background of the line synchronization pulse with a level that is below the level of the porch by a determined value, the result of the comparison controlling the gain of said element.

3. An apparatus according to claim 1 or 2, comprising: a means to control the gain of said element as a function of the number of times in a given video frame this overstepping indicator pulse occurs.

4. An apparatus according to claim 3, wherein the means sensitive to the frequency of the overstepping indicator pulse comprise a monostable triggered by the overstepping indicator pulses, the duration of the output signal of the monostable being equal to, or little different from, the duration of a line, and a low-pass filter, the output of which is connected to the gain control input of said element.

5. An apparatus according to claim 4, wherein the duration of the monostable is about 60 microseconds.

6. An apparatus according to claim 4, including an analog/digital converter with parallel outputs, one output of which produces a bit representing, according to its value, the sign of the difference between the line synchronization pule and its prescribed value.

7. An apparatus for the reception of video signal, including an analog/digital converter for the conversion, into digital signals, of the analog video signals between a pre-determined lower level and a pre-determined upper level, said apparatus comprising a means to hold the bottom of the line synchronization pulse substantially at said lower level by employing an overstepping signal from the most significant bit outputted form said analog/digital converter.

8. An apparatus according to claim 7, comprising a variable gain element 10 receiving the video signal and applying it to the input of the converter, the gain of this element being controlled to hold said coincidence between the bottom of the line synchronization pulse and the lower level.

9. An apparatus according to claim 7 or 8, comprising a clamping circuit, to hold the back porch of the video signal at a determined level above the lower level.

10. An apparatus according to claim 9, wherein the level of the back porch is higher than the lower level by about 0.7 volts.

11. An apparatus according to claim 1 or 8, wherein the element is a variable gain amplifier or an automatic gain control device.

* * * * *